No. 882,244. PATENTED MAR. 17, 1908.
F. W. GIBSON.
TWINE HOLDER.
APPLICATION FILED JAN. 23, 1908.

2 SHEETS—SHEET 1.

Witnesses:
Edwin T. Luce
Irving W. Townsend

Inventor:
Francis W. Gibson,
by Emery and Booth
Attys.

No. 882,244. PATENTED MAR. 17, 1908.
F. W. GIBSON
TWINE HOLDER.
APPLICATION FILED JAN. 23, 1908.

2 SHEETS—SHEET 2.

Witnesses:

Inventor:
Francis W. Gibson,
by Emery and Booth Att'ys.

THE NORRIS PETERS CO., WASHINGTON, D. C.

UNITED STATES PATENT OFFICE.

FRANCIS W. GIBSON, OF WEST ROXBURY, MASSACHUSETTS, ASSIGNOR TO THE H. D. BEACH COMPANY, OF COSHOCTON, OHIO, A CORPORATION OF OHIO.

TWINE-HOLDER.

No. 882,244.　　　Specification of Letters Patent.　　Patented March 17, 1908.

Application filed January 23, 1908. Serial No. 412,299.

*To all whom it may concern:*

Be it known that I, FRANCIS W. GIBSON, a citizen of the United States, and a resident of West Roxbury, in the county of Suffolk and State of Massachusetts, have invented an Improvement in Twine-Holders, of which the following description, in connection with the accompanying drawings, is a specification, like letters on the drawings representing like parts.

Figure 1:
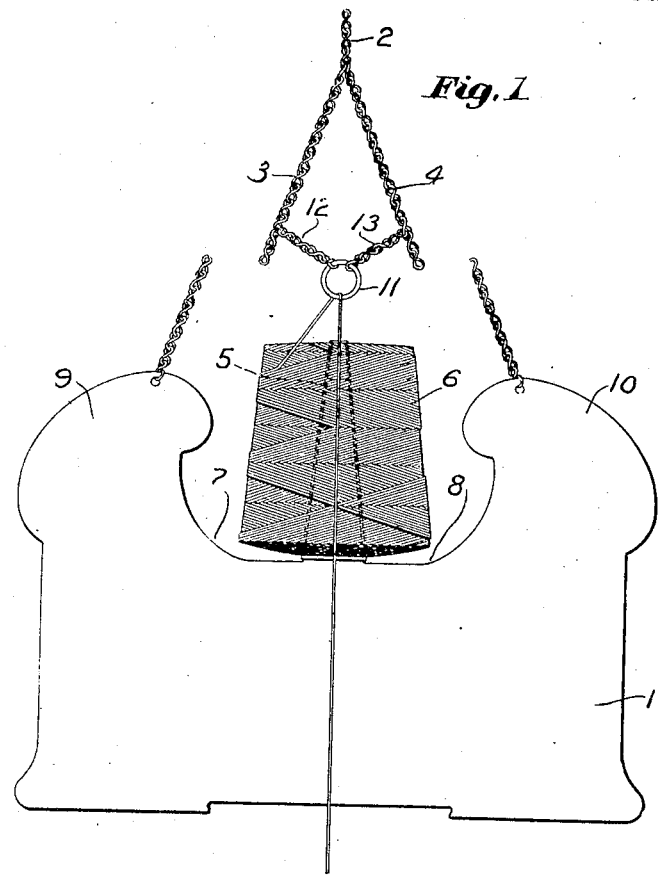
Figure 2:
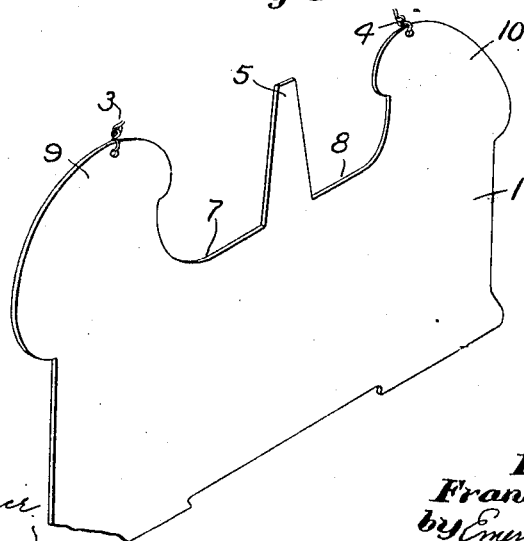
Figure 3:
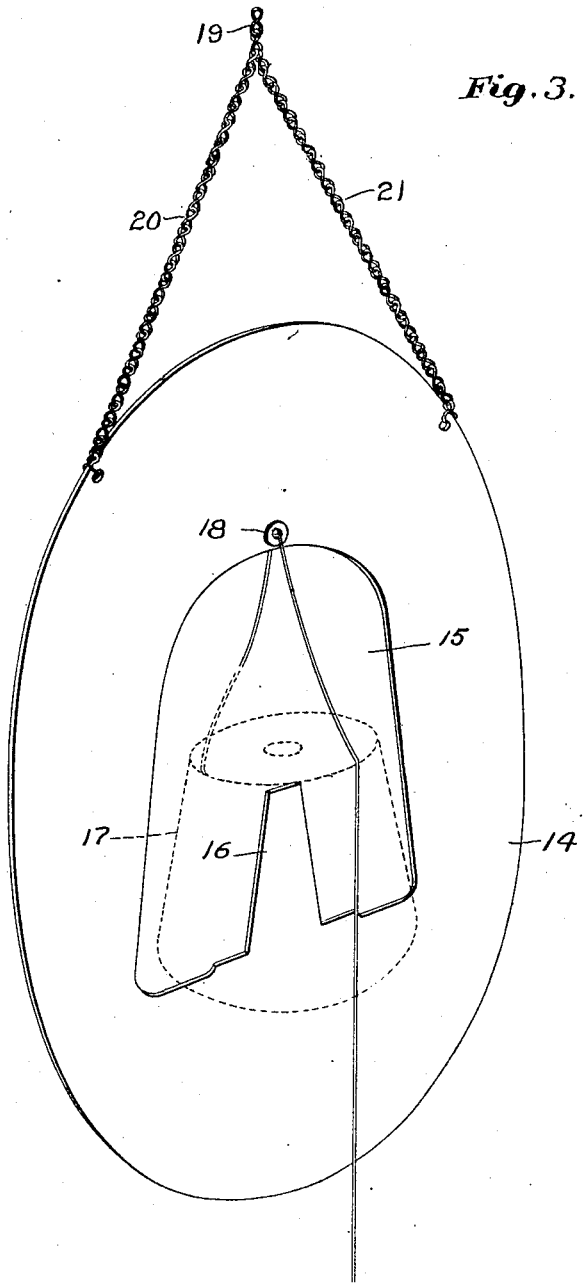

This invention relates to twine holders, one type or embodiment whereof is shown in the accompanying drawing, wherein Figure 1 is a side elevation, partly broken away, of a twine holder embodying my invention, a twine package being positioned thereon; Fig. 2 is a perspective view of the sheet or plate of the twine holder; and Fig. 3 is a perspective view of another form of the invention.

The twine holder, to which this invention relates, is intended preferably to be suspended, as by a flexible connection from an overhead support. In this manner, wall space in the store wherein the twine holder is advantageously used may be entirely reserved for the storing or display of goods or for other purposes. Moreover, if the twine holder be suspended from the ceiling or other overhead support, it is not liable to injury, and at the same time is readily accessible for use as where it is suspended directly over the counter of a store. The user of a twine holder of the general type herein referred to is apt to draw upon the twine by a sudden jerk in the haste of waiting upon customers and frequently with the result of overturning the receptacle or support and spilling the twine. I have devised a simple and inexpensive twine holder, wherein a sheet or plate is provided that presents a relatively large surface acting to steady the oscillations of the twine holder when the twine is drawn upon for use, to reduce the amplitude of the vibrations which are always incurred when the twine is drawn upon and to balance the twine holder as a whole.

In the present embodiment of my invention and referring first to the form shown in Figs. 1 and 2, the sheet or plate forming the body of the twine holder is represented at 1, and is preferably substantially flat, and is connected by a preferably flexible suspending means, herein represented as a chain 2, to some overhead support, as the ceiling.

The suspending means is connected to the sheet or plate 1 in such manner as to maintain the latter in equilibrium. For this purpose, I have in this type of the invention provided the chain with members 3 and 4 connected with the sheet or plate 1 upon opposite sides of a vertical median line. Preferably formed with the sheet or plate, I provide one or more projecting portions 5 to penetrate and support for use a package or packages of twine, herein represented at 6 as a wound package. Preferably, the projecting portion 5, if but a single one be employed, extends from an edge, and in Figs. 1 and 2 from the upper edge of the sheet or plate and also preferably in the plane of the body of the latter, although it is apparent that such projecting portion or portions may extend in any desired or suitable direction, or may extend from some portion of the twine holder other than an edge thereof and at any suitable angle to the body of the plate.

For the sake of cheapness, the projecting portion 5 is formed integral with the sheet or plate 1, although it is apparent that it may be attached thereto in any suitable way and in either event may be reinforced, if desired. If desired, the sheet or plate may be recessed at opposite sides of the projection 5, as represented at 7 and 8, for the reception of the twine package, and if desired may also have opposite projecting members 9 and 10, to which the chain or other support may be attached, or, if desired, the sheet or plate may be suitably shaped in any manner to permit the mounting of the twine package upon the projecting portion. The shape and extent of the projecting portion 5 may be such as are required securely to support the twine package. Herein, such projecting portion is represented as tapering to penetrate and securely hold the tapering tube upon which the twine is wound. It is apparent that the projecting portions 7 and 8, if desired, may be of any suitable extent.

Preferably, I attach to the chain or other suspending means a guide for the twine. Herein, for the purpose, I have provided a ring 11 attached by short lengths of chain 12 and 13 to the chain members 3 and 4. The twine end is passed upwardly through the ring 11, and thence downwardly so as to be within ready reach of the user.

It will be apparent that in use the twine holder is steadied and balanced by the sheet or plate 1 which, being of relatively large area, steadies the movement of the twine holder, reduces the oscillations to a minimum, and balances the twine holder as a whole. By enlarging or supplementing the area of the sheet or plate, the balancing function of the twine holder may be enhanced. It is moreover apparent that if the twine be drawn axially and preferably upwardly from the package, there is less liability of upsetting the same than if the twine were drawn laterally. It is apparent that the projection 5 may loosely receive a package of twine for rotative movement thereof. If desired, suitable advertising matter may be placed upon one or both faces of the sheet or plate 1, which may be formed of any suitable material, as, for example, sheet metal.

In Fig. 3, I have illustrated a further form of my invention wherein a sheet or plate 14 is provided having an opening 15 formed within the perimeter thereof. From the lower edge of said opening, there is extending a projection 16 to receive a package of twine, such as indicated at 17 in dotted lines. If desired, a twine guide 18 may be employed, either formed in or directly mounted upon the sheet or plate 14 or otherwise suitably supported. The sheet or plate may be suspended in any suitable manner, as by a chain 19 preferably having portions 20 and 21 attached to the sheet or plate. It is apparent that the chain or other suspending means may, in certain forms of my invention, be attached at but a single point of the sheet or plate and yet maintain the same in equipoise.

Having thus described one type or embodiment of my invention, I desire it to be understood that although specific terms are employed, they are used in a descriptive and generic sense, and not for purposes of limitation, the scope of the invention being set forth in the following claims.

1. A twine holder comprising a steadying sheet or plate, means connected thereto to suspend the same from an overhead support, the connection of the suspending means to the sheet or plate being such that the latter is maintained in equipoise, said sheet or plate having a member adapted to penetrate a package of twine and to support the same for use, said sheet or plate presenting an extended surface to steady the oscillations of the holder when the twine is drawn upon for use and to balance the same.

2. A twine holder comprising a steadying sheet or plate, flexible means connected thereto to suspend the same from an overhead support, the connection of the suspending means to the sheet or plate being such that the latter is maintained in equipoise, said sheet or plate having formed therewith and extending upwardly therefrom a projecting portion adapted axially to enter and support for use a package of twine, said sheet or plate acting to balance the twine package and to present an extended surface to steady the oscillations of the holder when the twine is drawn upon for use.

3. A twine holder comprising a steadying sheet or plate, means connected thereto to suspend the same from an overhead support, the connection of the suspending means to the sheet or plate being such that the latter is maintained in equipoise, said sheet or plate having a member adapted to penetrate a package of twine and to support the same for use, the sheet or plate being recessed upon opposite sides of the penetrating member for the reception of the twine package.

4. A twine holder comprising a steadying sheet or plate, means connected thereto to suspend the same from an overhead support, the connection of the suspending means to the sheet or plate being such that the latter is maintained in equipoise, said sheet or plate having a member adapted to penetrate a package of twine and support the same for use, the sheet or plate being recessed upon opposite sides of the penetrating member for the reception of the twine package, thereby providing opposite upwardly extending portions, to which the suspending means is connected, said sheet or plate acting to balance the twine package and to oppose an extended surface to steady the oscillations of the holder when the twine is drawn upon for use.

In testimony whereof, I have signed my name to this specification, in the presence of two subscribing witnesses.

FRANCIS W. GIBSON.

Witnesses:
 HERBERT A. PALMER,
 IRVING W. TOWNSEND.